United States Patent [19]

Wepner et al.

[11] 4,319,504

[45] Mar. 16, 1982

[54] DAMPING DEVICE FOR ABRUPTLY OCCURRING FORCES IN A SHEAR OR SHEAR PRESS MACHINE

[75] Inventors: Joachim Wepner, Gevelsberg; Kurt Wengenroth, Wuppertal, both of Fed. Rep. of Germany

[73] Assignee: Rolf Peddinghaus, Ennepetal, Fed. Rep. of Germany

[21] Appl. No.: 124,247

[22] Filed: Feb. 25, 1980

[30] Foreign Application Priority Data

Mar. 8, 1979 [DE] Fed. Rep. of Germany ....... 2909119

[51] Int. Cl.$^3$ ...................... B23D 15/04; B23D 33/00
[52] U.S. Cl. ..................... 83/157; 83/526; 83/617; 267/119; 267/127
[58] Field of Search ................ 83/157, 373, 526, 617, 83/748; 248/562, 566, 536; 92/108, 143; 91/25, 26, 206–209; 267/114, 118, 119, 124, 126, 127, 129

[56] References Cited

U.S. PATENT DOCUMENTS 3,375,001 3/1968 Hennells .......................... 267/119
3,418,888 12/1968 Mercier ........................... 91/26
3,908,496 9/1975 Moelbert ......................... 83/157

FOREIGN PATENT DOCUMENTS 2218687 10/1973 Fed. Rep. of Germany ........ 83/157
2321663 11/1974 Fed. Rep. of Germany ........ 83/617
1373950 11/1974 United Kingdom ................. 83/157

*Primary Examiner*—James M. Meister
*Assistant Examiner*—K. Bradford Adolphson
*Attorney, Agent, or Firm*—Dressler, Goldsmith, Shore, Sutker & Milnamow, Ltd.

[57] ABSTRACT

Apparatus is provided for damping a billet shears assembly and includes a damping cylinder and piston mounted to the stationary portion of the assembly opposite the moving shear blade. The damping piston defines a control cylinder and the base of the damping cylinder carries a control piston adjustably fixed in the control cylinder in axial alignment with the damping piston over the entire stroke distance. A pneumatic fluid supply line in the control piston connects the damping cylinder with the control cylinder and is provided with a non-return valve.

5 Claims, 2 Drawing Figures

DAMPING DEVICE FOR ABRUPTLY OCCURRING FORCES IN A SHEAR OR SHEAR PRESS MACHINE

TECHNICAL FIELD

The invention relates to a damping device for abruptly occurring forces in machinery, such as the cutting shock in shears and punches, according to the introductory definition of claim 1.

BACKGROUND ART

Damping devices of this type are intended to dissipate under control rapid fluctuations in the stresses occurring which may possibly be detrimental to the relevant machines and/or tools used on them, thereby to damp and reduce the noise. The noise is caused by vibrations in the machine which can be propagated in or from the latter as body sound and which by vibrations of the surfaces of the machine, its parts and/or the tools likewise set the air surrounding it into vibrations in the audio frequency range of approximately 16 to 16,000 Hz and generate air-conducted noise.

This phenomenon appears particularly in the case of abrupt operations, of which the creation of noise during cutting by shears and punches may be regarded as typical. Three consecutive phases can be distinguished in such shears and punches, namely after the application of a restrainer or application of an offcut holder—i.e., after the workpiece to be machined has been anchored—a first phase of the elastic stressing, in which the stress occurring in the material to be cut does not yet exceed the yield point. When the yield point is exceeded the actual cutting operation commences as a second plastic phase. The cutting edges then penetrate into the workpiece up to 0.2 to 0.5 times its thickness, depending upon the strength of the material to be cut. The stress in the workpiece increases up to its ultimate strength. In the third phase of cutting, cracks appear, commencing at the cutting edges, and are quickly propagated into the interior of the workpiece and ultimately lead to the fracture of the workpiece at the point of cut. The machine or the machine frame is now subjected to force and resiliently prestressed in accordance with its spring characteristic until the maximum cutting force is attained. At the moment of parting of the workpiece, the machine or the machine frame is abruptly relieved. This gives rise to more or less strongly pronounced vibrations in the direction of all degrees of freedom. This phase is therefore also called the vibration phase. This relief is generally completed in the very short time e.g., approximately 0.1 ms. Due to the abrupt short-term transition of forces, vibrations are excited in the machine which are propagated as body sound to the surface of the machine or of the machine frame and are radiated from there as air-conducted sound. The height of the noise level is then a function of the magnitude of the force transition or of the value of the cutting force and of the time in which the relief is completed. This phenomenon could only be totally prevented if it were possible to eliminate the force transition, for which purpose the force build-up phase and the force dissipation phase would have to follow a substantially similar pattern.

A number of measures and apparatuses have already been proposed in order to solve this problem, such as a roof-shaped construction of the ram in punching. Another possibility, also suitable for shears, lies in the use of so-called cutting shock dampers. By this means, although the cutting requirement is not reduced, it is achieved that after the workpiece has been parted the machine is not relaxed in an extremely short time, whereby the generation of vibrations is largely prevented. The mode of operation is that the moving tool or the machine ram or the shear blade strikes against a more or less hard stop at the moment when the machine frame is most highly stressed, and is thus impinged by a counterforce, whereby a full vibration of the machine frame in the relief phase is prevented. However, such damping devices necessitate an optimally accurate coordination between their rigidity and that of the machine, so that universal application is difficult. Although such damping devices leave the cutting or working force substantially unchanged, nevertheless the force decay phase is considerably prolonged in time and the force transition substantially reduced.

A damping device of the type initially defined is known (German Offenlegungsschrift No. 25 12 822 to Horst Schenk and published Sept. 30, 1976) and substantially comprises a damping cylinder, a damping piston reciprocatingly movable in its damping cylinder, which co-operates with the hydraulic pressurised medium contained in the damping cylinder between the damping piston and the base, and an attached pressure accumulator. This results in the following mode of operation: before the actual parting of the workpiece, the moving tool or the moving machine part alights upon the damping piston of at least one damping device (depending upon whether one or more damping devices are used). During the subsequent further descent of the moving tool the pressurised medium is displaced out of the damping cylinder through a line with throttle into the pressure accumulator. By this means the force required to intercept the moving tool is built up slowly. At the moment of parting the damping device absorbs the entire pressure force and the subsequent movement of the moving machine part is intercepted by means of the line with throttle until a relief line is opened and can thus become operative. The residual movement of the moving tool then occurs with greater velocity, because the pressurised medium can escape out of the damping cylinder through the relief line without much resistance into the pressure accumulator. After completion of the work movement and during the ascent of the moving tool, in the known damping device the damping piston returns into the initial position. Simultaneously the damping cylinder is filled afresh with pressurised medium from the pressure accumulator.

The essential point is the detection of the moment of separation, i.e., the moment of maximum loading. For this purpose, in the known damping device the elongation of the machine frame dictated by the loading is detected, as a function of which the flow cross-section of the line is modified, so that it is the smallest at the moment of maximum loading, whilst after separation the flow cross-section increases slowly back to its initial value. For this purpose in the known damping device a transmission linkage articulated to the machine frame is provided, which transmits the elongation of the machine frame occurring during the machining operation before the tool breaks through the workpiece to a relief valve arrangement. The latter has, arranged in a control cylinder chamber, the housing of which is mounted firmly on the damping cylinder, a control piston movable axially by the transmission linkage, the linkage end of which is frustoconical in shape and surrounded by an associated substantially cylindrical wall. The pressurised medium displaced by the damping piston is fed to the chamber formed at this end and discharged through a line in the control housing at the other end of the control piston into the pressurised medium accumulator. The elongation dictated by the loading causes the control piston, through the intermediary of the transmission linkage, to be moved in the control housing, so that the flow cross-section is gradually reduced. The stroke length of the damping piston is preadjusted, so that at the moment of maximum loading the flow cross-section between control piston and control housing is practically closed. For reasons of convenience a shunt throttle may also be provided, by which a minimum passage quantity is ensured.

The known damping device is relatively complicated, whilst a difficult adjustment of the transmission members is necessary due to the comparatively small absolute elongations of the machine frame. Furthermore, due to the direct intervention with the machine frame, the subsequent equipment of existing machine tools is only possible with great difficulty and great expense. This is particularly disadvantageous when the behaviour of the workpiece during machining changes frequently—e.g., because of different material or different dimensions. Furthermore the line with throttle is arranged asymmetrically, so that particularly at the maximum pressure build-up, staggered attacking forces come into effect, by which the desired effect is detrimentally influenced and above-average wear on one side is caused.

A damping device is also known (German Patenschrift, No. 26 53 714 to Adam Dittner and patented on Nov. 9, 1978.), wherein these complicated measures are avoided. In this known damping device the pressure in the damping cylinder is detected, converted into an electrical signal and compared with an adjustable desired value. Slow variations in the pressure and hence in the signal are compensated by means of an electrical integration member with an appropriate time constant. A rapid variation in the pressure, as when the tool breaks through the workpiece, then produces an output signal which is compensated, not immediately but after a time delay, by the integration member. The time delay permits a damping. The pressure in the damping cylinder chamber which counteracts the movement of the moving machine part, is maintained at the desired value by means of a proportional regulator valve adjustable by the integration member. However, the abruptly rising pressure occurring at the breakthrough is followed by the opening of the proportional regulator valve not immediately, but only with time delay in accordance with an e-function, whereby the damping is achieved.

In a mechanical solution, instead of the electrical integration member a flow-sensitive valve is used (German Offenlegungsschrift No. 28 04 185 to Louis Francescon Canieri and published on Aug. 10, 1978) which terminates the flow in the case of a sudden pressure rise. Both damping devices are essentially independent of the machine tool and connected to the latter by pressurised medium lines. Space is therefore required outside the machine tool. In addition, these damping devices are only satisfactorily applicable to hard presses or the like. Furthermore the effect of the damping device necessarily occurs only after the breakthrough. An adjustment to a point in time, e.g., just before the moment of maximum loading, is impossible. The effects of the abruptly occurring shock cannot therefore be totally eliminated.

SUMMARY OF THE INVENTION

It is the underlying aim of the invention to develop the damping device initially mentioned so that, with high operational reliability, low wear and rapid stroke repetition frequency, a structurally simple and non-faultprone construction, and particularly a good adaptability and co-ordinability to a wide range of different materials and/or workpiece thicknesses can be achieved.

The invention is also intended particularly to improve the damping of billet shears or profile steel shears of the construction described in German Auslegeschrift No. 1 815 691 to Joachim Wepner and patented on Feb. 14, 1974.

The integrated construction of damping cylinder and damping piston and control cylinder and control piston not only makes possible a highly space-saving and therefore simple construction. Any skewing between a piston and its cylinder, and hence one-sided wear, is also prevented under any pressure and flow conditions during the discharge of the pressurised medium from the control cylinder and the damping cylinder. An additional centering of the control piston in the control cylinder, and hence also with reference to the damping cylinder, is also achieved. Due to the adjustability of the position in which the throttle between control piston and control cylinder has its minimum flow cross-section, the damping device is adaptable to practically all conceivable practical cases. Thus a counterforce corresponding in value and time curve to the development of the cutting force can be opposed so that an abrupt variation of stresses and hence the development of noise are largely prevented.

Such an adjustability of the position of the control and sealing surfaces can be achieved in that the control piston is axially adjustable and lockable, so that an adaptation to different workpiece thicknesses and strengths is attainable in a simple manner. An adaptation to the quantity of the pressurised medium discharged and an adaptation of the pressure build-up to prescribed force conditions can also be achieved by this means.

Particularly if a shunt throttle of variable flow cross-section placed in by-pass to the nonreturn valve is provided, the damping device constructed according to the invention can very rapidly be made to act hard or softly. Said shunt throttle may be fully integrated in the control piston and therefore occupies no additional space. An adjustability of the flow cross-section of the shunt throttle may advantageously be achieved, e.g., in that the position of the valve element of the nonreturn valve in the control piston is modified so that a minimum flow cross-section between the valve seat and the valve element is ensured. Symmetrical flow conditions are advantageously achieved in that the adjustment of the position of the valve element of the nonreturn valve is effected by means of an adjusting rod coaxial to the piston rod, which maintains the valve element centred counter to the force of a restraining spring of the nonreturn valve or of another pretension.

The initial position of the damping piston, i.e., the position in which the force exerted by the moving tool can attack for the first time, is advantageously also adjustable. For this purpose there may be attached axially parallel to the head of the damping piston by means of a yoke-like component a rod which is guided by its free end in a projection on the exterior of the damping cylinder, whilst an axially adjustable stop-e.g., a screw nut-is provided on the rod opposite a stop surface on the projection.

Said stop may e.g., actuate a control member whereby the movement of the moving tool is tripped, thus ensuring that the damping process is always commenced in the same prescribed position.

The damping device constructed according to the invention is particularly applicable to billet shears or profile steel shears according to DE-PS No. 1 815 691. Then in that case the off-cut holder of said billet shears or profile steel shears is advantageously the yoke-like component and is located opposite the moving tool with reference to the workpiece to be sheared off. In this case the control piston is connected to the stationary tool coaxially with the damping piston.

Already existing machine tools are also suitable for the incorporation of the damping device constructed according to the invention, without an appreciable change in the space requirements.

BRIEF DESCRIPTION OF THE DRAWINGS

The invention is explained more fully hereinbelow with reference to an exemplary embodiment illustrated in the accompanying drawing, wherein.

DETAILED DESCRIPTION OF THE PREFERRED EMBODIMENTS

Figure 1:
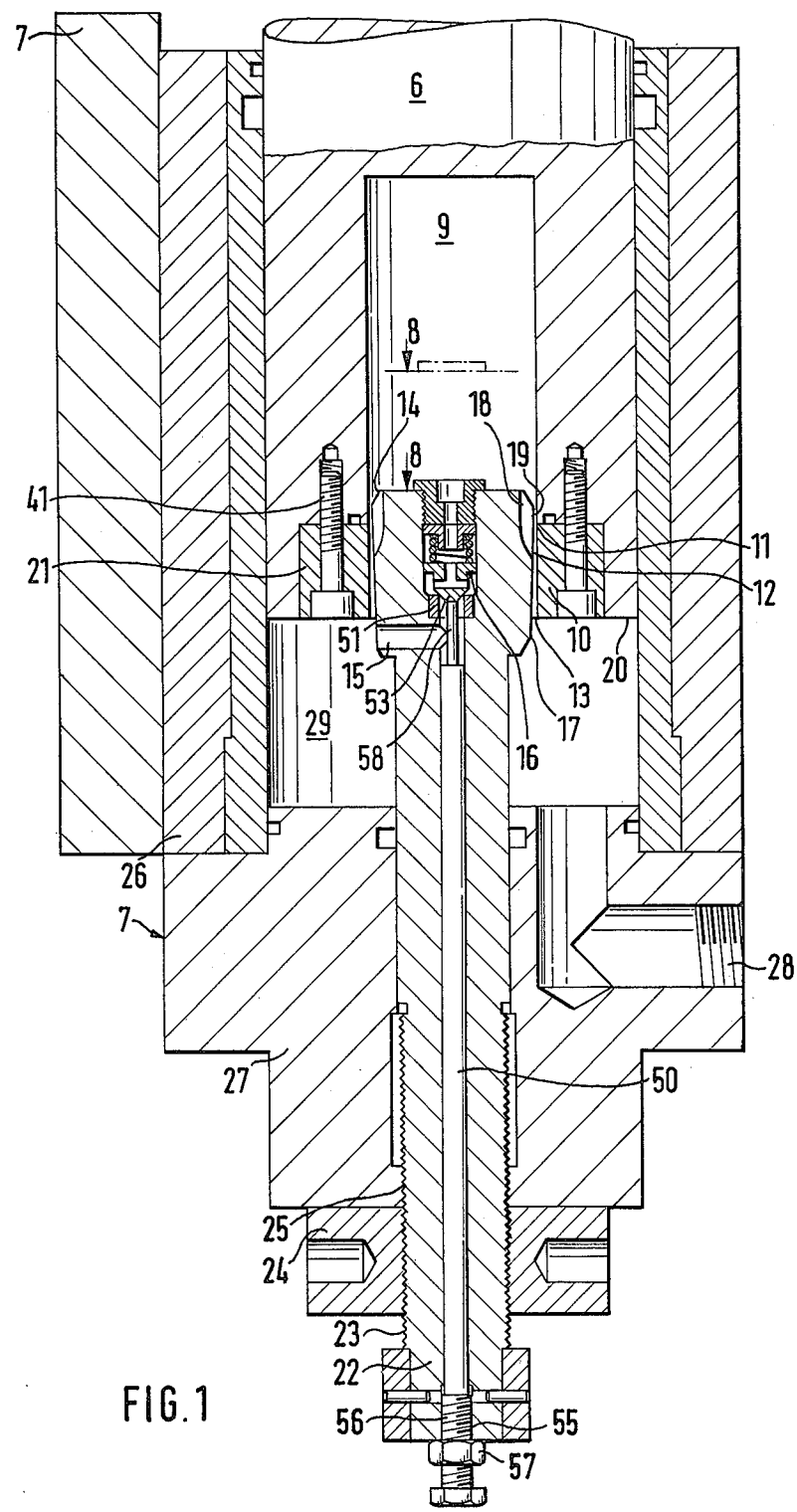
FIG. 1 shows a damping device for abruptly occurring variations in stresses and resulting noise in an axial section.

According to FIG. 1 the damping device for abruptly occurring variations in stresses and resulting noise in corresponding machine tools, such as the cutting shock in shears, punches or the like, exhibits a hydraulic damping piston 6 co-operating with a moving tool and a control piston 8 attached adjustably to a stationary machine part 7. The damping piston 6 is slidable coaxially in a damping cylinder 26 attached to the stationary machine part 7, into which the control piston 8 also protrudes coaxially. The control piston co-operates with a control cylinder 9 constructed in the damping piston 6. Thus an annular pressure chamber 29 surrounding the control piston 8 and its piston rod 22 is thus constructed between the base 27 of the damping cylinder 26 and the opposite end face 20 of the damping piston 6. The base 27 also contains a connecting line 28 for the supply and discharge of the pressurised medium into the annular pressure chamber 29.

The control piston 8 is guided in the control cylinder 9, whilst the passage of the pressurised medium can occur between them. The control piston 8 and the control cylinder 9 are constructed so that the flow cross-section for the pressurised medium varies as a function of the mutual position between control piston 8 and control cylinder 9.

In the exemplary embodiment illustrated, there is inserted into the end face 20 of the damping piston 6 a ring seal 10 having a preferably cylindrical sealing surface 11 protruding inwards lip-fashion and extending to a comparatively short length axially, the inside diameter of which is smaller than that of the control cylinder 9 in the damping piston 6. A cylindrical cavity 21 is provided at the open end face 20 of the damping piston 6 to accommodate the ring seal 10. The ring seal 10 is fixed e.g., by means of screws 41 and may therefore be constructed as an easily exchangeable wearing part.

The control piston 8 is provided, approximately in the central region of its axial longitudinal extent, with an axially extending preferably likewise cylindrical control surface 12 corresponding approximately to the diameter of the sealing surface 11 of the control cylinder 9 in the damping piston 6. The sealing surface 11 and/or the control surface 12 may be extremely narrow, e.g., 4 to 5 mm wide. The sealing surface 11 and the control surface 12 are adjoined in both axial directions of the control piston 8 by passage orifices 13 and 14 for the pressurised medium.

The section 17 of the control piston 8 remote from the control cylinder and adjoining the control surface 12 is constructed conically tapered so that the passage orifice 13 has the form of a ring gap widening gradually outwards. The section of the control piston 8 confronting the control cylinder 9 is provided with longitudinal grooves 18 extending as far as the control cylinder 9, which terminate inclined to the sealing surface 12. The webs 19 subsisting between the longitudinal grooves 18 serve as guide means for the control piston 8 with reference to the sealing surface 11 and hence with reference to the control cylinder 9 in the damping piston 6.

A pressurised medium supply line 15, in which a nonreturn valve 16 is arranged, which leads from outside the damping piston 6 into the control cylinder 9, is made in the control piston 8.

The piston rod 22 of the control piston 8 is maintained axially adjustably and lockably by means of a screwthread 23 and of a lock nut 24 in a screwthreaded bore 25 of the stationary machine part 7 or of the base 27 of the damping cylinder 26. By this means it is possible to adjust and determine infinitely and accurately the point of contact or engagement of the sealing and control surfaces 11 and 12.

Figure 2:
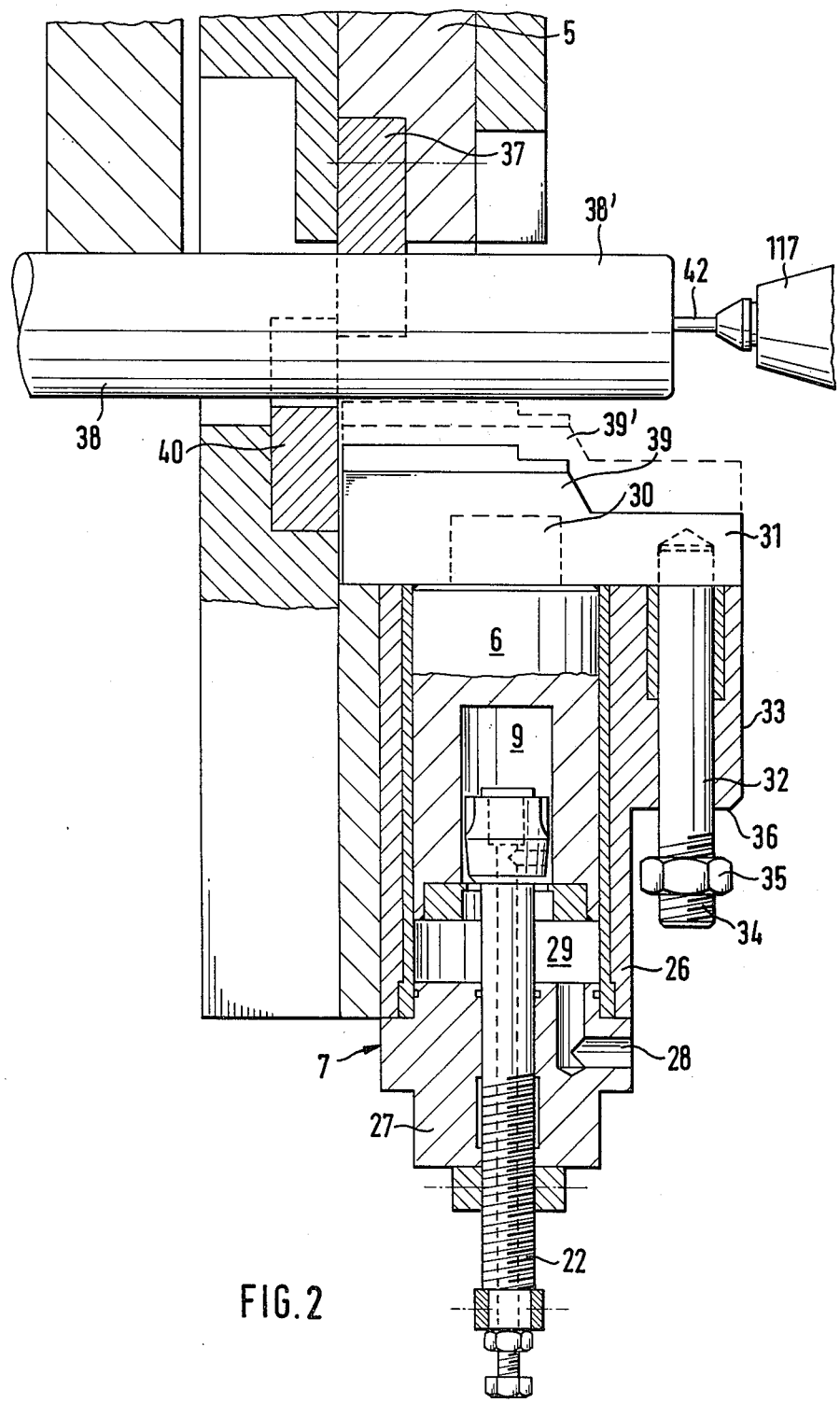
FIG. 2 shows the device according to FIG. 1 in conjunction with billet shears or profile steel shears on a smaller scale.

According to FIG. 2 there is attached to a head 30 of the damping piston 6 at its end opposite to the annular pressure chamber 29 a yoke-like component 31, to which there is attached axially parallel to the damping piston 6 a rod 32, the free end of which is guided with axial sliding mobility in a projection 33 of the fixed machine part 7 on the exterior of the damping cylinder 29 and carries on a screwthread 34 of its free end an axially adjustable stop element 35 opposite a stop surface 36 on the projection 33. Since the stroke length of the yoke-like component 31 is thus adjustable by means of the stop element 35, the initial position of the device can be fixed.

FIG. 2 shows the device in conjunction with billet shears or profile steel shears which exhibits a stationary shear blade 40 attached to a fixed machine part 7 and a shear blade 37 co-operating with the latter, attached to a moving machine part 5 and constituting the moving tool. Located opposite the moving shear blade 37 with reference to a workpiece 38 is an offcut holder 39 constituted by the yoke-like component 31, which is adjustable in its position by means of the damping piston 6 and of the stop element 35 and is loadable towards the workpiece 38 by the pressurised medium acting upon the damping piston 6.

In manner known per se (cp. DE-PS No. 1 815 691) the annular pressure chamber 29 is loaded through the connecting line 28 with a pressurised liquid as pressure medium e.g., through the intermediary of a nonreturn valve (not shown) and a hydropneumatic pressure medium converter (likewise not shown). The control cylinder 9 is then likewise supplied with the pressurised liquid through the pressurised medium feed line 15 and the nonreturn valve 16 in the control piston 8. The connecting line 28 serves also to discharge the pressurised liquid from the annular pressure chamber 29 and from the control cylinder 9, whilst the pressurised liquid from the control cylinder is pumped through the passage orifices 13, 14 between the control piston 8 and the control cylinder 9 in the damping piston 6 into the annular pressure chamber 29. The discharge of the pressurised liquid occurs in manner known per se by return through an adjustable overpressure valve (not shown) into the pressure medium converter. The pressure medium converter is connectable to a pressurised gas source (not shown).

The device thus constituted has the following mode of operation and function:

When a workpiece 38 is moved against a length stop 117, it is achieved e.g., by means of a trip member 42 that the hydropneumatic pressure medium converter is loaded with pressurised gas by the pressurised gas source, whereby pressurised liquid is supplied through the connecting line 28 to the annular pressure chamber 29 and through the pressure medium supply line 15 and through the nonreturn valve 16 to the control cylinder 9 in the damping piston 6. Due to the (equal) pressure existing in the control cylinder 9 and in the pressure chamber 29, the damping piston 6 assumes a work position in which the offcut holder 39 occupies the initial position 39' shown by dash lines and abuts against the (as yet unloaded) workpiece 38, said initial position 39' being fixed by the abutment of the stop element 35 against the stop surface 36 (FIG. 2).

The offcut holder 39 is moved by the force delivered in the shearing direction to the moving shear blade 37, when transmitted through the resulting workpiece offcut 38', out of the initial position 39' shown by dash lines, into a relatively withdrawn lower rest position shown by solid lines.

Through the intermediary of the workpiece offcut 38' produced by the shearing, the moving shear blade 37 exerts pressure upon the offcut holder 39 and hence upon the damping piston 6 so that the pressure liquid is increasingly loaded with pressure. A part of the pressure liquid is then displaced out of the control cylinder 9 and through the longitudinal grooves 18 of the control piston 8 past the control surface 12 and the sealing surface 11 into the pressure chamber 29, from the latter into the pressure medium converter counter to the gas, e.g., air or nitrogen, present there. Simultaneously the damping piston 6 is displaced with reference to the control piston 8 by the pressure and is ultimately brought into a position in which the control surface 12 and the sealing surface 11 are mutually opposite. Since this causes the passage orifices 13, 14 to be virtually blocked, the counterforce against the moving shear blade 37 is greatest at this moment. The control piston 8 is then anchored in the fixed machine part 7 so that at that moment the force which is exerted by the moving shear blade 37 upon the workpiece 38 is also at its greatest. This force occurs at or just before the actual separation phase. Because the control surface 12 and the sealing surface 11 move away from each other axially at the commencement of separation or at the commencement of the stress decay caused by the separation, the passage orifices 13 and 14 are released again with a smooth transition so that the pressure liquid can be displaced out of the control cylinder 9 in increasing quantity and with decreasing pressure through the longitudinal grooves 18 past the sealing surface 11 and the control surface 12. At the completion of this work cycle the damping piston 8 assumes the rest position shown in FIG. 2. A fresh work cycle can commence.

By virtue of the combination, adjustable in its porportions, of a stiff pressure build-up in the control cylinder 9 and also a relatively soft pressure build-up in the damping cylinder 26 or the pressure chamber 29 with reference to the hydropneumatic pressure medium converter in conjunction with a precise determination of the moment of maximum counterforce due to the adjustability of the meeting point of control and sealing surfaces 11, 12 by means of the piston rod 22 and of the lock nut 24, results closely approaching optimum conditions can be achieved for different workpiece thicknesses and particulary workpiece characteristics. An adjustment in this context may be performed in a simple manner by means of a scale co-operating with the screwthread and of a family of curves drawn up empirically and taking into consideration the workpiece thickness and workpiece strength. The adjustment may also be made by ear. Of course, these advantages are obtainable not only in the case of the machine tool illustrated as an exemplary application, but in all cases in which abruptly occurring stress variations have to be absorbed and noise to be prevented.

It has been discovered that it may be convenient if the passage orifices 13, 14 are not completely blocked at the moment of highest loading, so as to obtain a soft transition. But since on the other hand, in other practical cases, these passage orifices 13, 14 should be closed as far as possible at the moment of highest loading, it is advantageous if the passage orifices are in fact completely blocked when control surface 12 and sealing surface 11 are mutually opposite, but a shunt throttle is provided in bypass to the passage orifices 13, 14.

Said shunt throttle is advantageously provided, as illustrated, in the piston rod, namely in bypass to the nonreturn valve 16.

At the same time said shunt throttle is integrated into the nonreturn valve 16 so that the valve element 53 of the nonreturn valve 16 can come into abutment with its valve seat 51 under the influence of a spring 52 braced in a cover 54 only when a complete blockage of the passage orifices 13, 14 is required to be obtained.

Now if it is required to provide a shunt throttle of finite cross-section, then the valve seat 51 may e.g., be constructed by means of grooves etc., so that despite the abutment of the valve element 53 against the valve seat 51 a flow cross-section corresponding to the flow cross-section of the shunt throttle is formed. For this purpose the valve seat 51 may e.g., be constructed as an exchangeable ring.

In the exemplary embodiment illustrated there, an adjusting rod 50 is guided coaxially in the piston rod 22 of the control piston 8, whereby the position of the valve element 53 with reference to the valve seat 51 is adjustable. For this purpose the piston rod 22 exhibits a screwthreaded bore 56 into which a male screwthread 55 of the adjusting rod 50 can engage, whilst the position between adjusting rod 50 and piston rod 22 is lockable by means of a lock nut 57. At the other end of the adjusting rod 50 confronting the valve element 53, a taper 58 coaxial to the passage orifice of the valve seat 51 is provided so that an adequate flow cross-section for the pressure medium supply line 15 subsists between the taper 58 and the passage orifice of the valve seat 51. The end of the taper 58 abuts against the valve element 53 and thus constitutes a stop for the latter. By adjusting the adjusting rod 50 in the screwthread 55, 56 and by locking the position by means of the lock nut 57, a flow cross-section between valve element 53 and valve seat 51 such as to constitute the shunt throttle can be obtained in this way. In this manner, whilst maintaining symmetrical flow conditions, an adjustable shunt throttle is achieved which is also fully closeable. By this means the flow cross-section of the shunt throttle is advantageously made adjustable, namely between a position in which the valve element 53 comes into abutment only against the valve seat 51 and completely blocks the pressure medium supply line 15, and a position which corresponds to a prescribed maximum value of the flow cross-section of the shunt throttle, which may correspond e.g., even to the flow cross-section of the pressure medium supply line 15 if no damping by the device is required to be achieved.

It is obviously also possible to construct the device so that it is not the control piston 8, as illustrated and explained in detail, but the damping piston 6 which is axially adjustable in the sense of a variation in the stroke length in order to determine the minimum value of the displacement at the moment of maximum load.

What is claimed is:

1. In a damping device for abruptly occurring forces in a shear or shear press machine, wherein a moving tool is guided opposite a stationary tool in the machine frame, a damping piston movable in the line of action of the moving tool attached to the stationary tool and slidable in a damping cylinder so as to displace a pressurized medium from said damping cylinder, a control piston slidable in a control cylinder positioned in axial direction within said damping piston so as to displace a pressurised medium from said control cylinder through a passage defined between said control piston and said control cylinder, said passage volume decreases by a relative amount as the loading increases down to a minimum volume at the moment of maximum loading, said control piston being secured to a base portion of said damping cylinder and adjustable over the entire stroke distance of said moving tool, a pressurized medium supply line through said control piston into said control cylinder and closeable by a non-return valve means associated therewith which also serves as a shunt throttle, said valve means having a valve element secured to a rod which extends through a piston rod which is secured to said control piston and in axial alignment therewith, said rod being selectively adjustable within said piston rod so as to permit selective adjustment of said valve element and thereby control the passage of pressurized medium through said valve means.

2. The damping device as defined in claim 1 wherein a radially inwardly projecting sealing surface associated with said control cylinder cooperates with a control surface associated with a longutudinal section of said control piston so as to define said passage between said control piston and said control cylinder.

3. The damping device as defined in claim 2 wherein a conical taper is provided on a longitudinal section of said control piston adjoining said control surface.

4. The damping device as defined in claim 3 wherein longitudinal grooves of varying cross-section defining dividing webs are provided in said control piston, said longitudinal grooves defining a passage orifice confronting said control cylinder on the longitudinal section of said control cylinder adjoining said control surface such that said dividing webs form a cylindrical envelope surface which has a diameter substantialy corresponding to the internal diameter of said sealing surface, said longitudinal grooves having ends which merge gradually into said control surface.

5. The damping device as defined in claim 2 wherein a ring seal defining said sealing surface is detachably inserted into an annular end face of said damping cylinder.

* * * * *